(12) United States Patent
LeBlanc

(10) Patent No.: US 10,782,678 B2
(45) Date of Patent: Sep. 22, 2020

(54) HISTORY COMPARE SOFTWARE

(71) Applicant: Lin and Associates, Inc., Phoenix, AZ (US)

(72) Inventor: Eric F. LeBlanc, Phoenix, AZ (US)

(73) Assignee: Lin and Associates, Inc., Phoenix, AZ (US)

( * ) Notice: Subject to any disclaimer, the term of this patent is extended or adjusted under 35 U.S.C. 154(b) by 240 days.

(21) Appl. No.: 15/903,961

(22) Filed: Feb. 23, 2018

(65) Prior Publication Data
US 2018/0181113 A1    Jun. 28, 2018

Related U.S. Application Data

(63) Continuation-in-part of application No. PCT/US2016/048741, filed on Aug. 25, 2016.
(Continued)

(51) Int. Cl.
    *G08B 21/00*      (2006.01)
    *G05B 23/02*      (2006.01)
    *G05B 19/042*     (2006.01)

(52) U.S. Cl.
    CPC ..... *G05B 23/0272* (2013.01); *G05B 19/0428* (2013.01); *G05B 23/0281* (2013.01)

(58) Field of Classification Search
    CPC ............ G05B 23/0272; G05B 19/0428; G05B 23/0281; G05B 23/0216; G05B 23/0232;
    (Continued)

(56) References Cited

U.S. PATENT DOCUMENTS 6,587,108 B1    7/2003    Guerlain
6,704,012 B1    3/2004    Lefave
(Continued)

FOREIGN PATENT DOCUMENTS

WO    2017035377    3/2017

OTHER PUBLICATIONS

Publication WO2017205238 and ISR for PCT/US2017/033738.
(Continued)

*Primary Examiner* — Anh V La
(74) *Attorney, Agent, or Firm* — Allan Watts

(57) ABSTRACT

Computerized methods and software for communicating behavior of industrial systems to operators, for instance, in HMI environments. Various embodiments display values of different parameters of the system and an alert indicator for values that passed an operating limit established for the parameter during a particular preceding duration of time. In some embodiments, different indicators (e.g., shading, for example, adjacent to the value) are displayed for exceeding an upper operating limit or a lower operating limit (or both). In a number of embodiments, a plot is displayed for value that has passed an operating limit during the preceding duration of time, for instance, when the operator hovers a cursor over the value. In many embodiments, the operator can set the preceding duration of time, the operating limit(s), or both. In many embodiments, abnormal movements or process variability can be detected by the operator, for example, before the movements would otherwise be detectable.

23 Claims, 7 Drawing Sheets

Related U.S. Application Data

(60) Provisional application No. 62/294,041, filed on Feb. 11, 2016, provisional application No. 62/210,328, filed on Aug. 26, 2015.

(58) Field of Classification Search
CPC ......... G05B 2219/50065; G06F 3/0484; G06F 3/147; G06T 11/206; G06T 11/001; G01M 13/00
USPC ...... 340/679, 691.1, 691.6, 691.3, 540, 500; 715/771
See application file for complete search history.

(56) References Cited

U.S. PATENT DOCUMENTS

| | | |
|---|---|---|
| 9,495,276 B1 | 11/2016 | Friedman |
| 9,665,956 B2 | 5/2017 | Shikhman |
| 9,672,745 B2 | 6/2017 | Kneuper |
| 9,753,639 B2 | 9/2017 | Cieplinski |
| 10,255,702 B2 | 4/2019 | LeBlanc |
| 2007/0005266 A1 | 1/2007 | Blevins |
| 2007/0061786 A1 | 3/2007 | Zhou |
| 2007/0106761 A1 | 5/2007 | Beoughter |
| 2007/0130572 A1 | 6/2007 | Gilbert |
| 2007/0132779 A1 | 6/2007 | Gilbert |
| 2007/0139441 A1 | 6/2007 | Lucas |
| 2007/0150081 A1 | 6/2007 | Nixon |
| 2007/0168060 A1 | 7/2007 | Nixon |
| 2007/0168065 A1 | 7/2007 | Nixon |
| 2007/0174225 A1 | 7/2007 | Blevins |
| 2007/0179641 A1 | 8/2007 | Lucas |
| 2007/0211079 A1 | 9/2007 | Nixon |
| 2008/0066004 A1 | 3/2008 | Blevins |
| 2008/0077257 A1 | 3/2008 | Exxon |
| 2008/0229226 A1 | 9/2008 | Rowbottom |
| 2008/0300698 A1 | 12/2008 | Havekost |
| 2009/0149981 A1 | 6/2009 | Evans |
| 2009/0306837 A1 | 12/2009 | Ausman |
| 2010/0188410 A1 | 7/2010 | Gilbert |
| 2011/0001636 A1 | 1/2011 | Hedrick |
| 2012/0064923 A1* | 3/2012 | Imes ...................... G05B 15/02 455/457 |
| 2012/0179319 A1 | 7/2012 | Gilman |
| 2013/0106864 A1 | 5/2013 | Boyer |
| 2014/0046458 A1 | 2/2014 | Timsjo |
| 2014/0277619 A1 | 9/2014 | Nixon |
| 2014/0277620 A1 | 9/2014 | Nixon |
| 2014/0282195 A1* | 9/2014 | Nixon ................ G05B 23/0216 715/771 |
| 2014/0344007 A1 | 11/2014 | Shende |
| 2015/0035834 A1 | 2/2015 | Axness |
| 2015/0106753 A1 | 4/2015 | Tran |
| 2015/0138205 A1 | 5/2015 | Rajagopalan |
| 2015/0213246 A1 | 7/2015 | Turgman |
| 2015/0323926 A1* | 11/2015 | Wang ................ G05B 19/0423 700/19 |
| 2016/0042541 A1 | 2/2016 | Nixon |
| 2017/0042488 A1 | 2/2017 | Muhsin |
| 2017/0132704 A1 | 5/2017 | Mauro |
| 2018/0024901 A1 | 1/2018 | Tankersley |

OTHER PUBLICATIONS

Publication WO2017035377 and ISR for PCT/US2016/048741 (Parent of this app).
Written Opinion for PCT/US2017/033738 (1 above).
Written Opinion for PCT/US2016/048741 (2 above).

* cited by examiner

HISTORY COMPARE SOFTWARE

RELATED PATENT APPLICATIONS

This patent application is a continuation-in-part of, and claims priority to, International Patent Application Serial Number PCT/US16/48741, filed on Aug. 25, 2016, which claims priority to U.S. Provisional Patent Application Ser. No. 62/210,328, filed on Aug. 26, 2015, titled: HISTORY COMPARE INVENTION, and to U.S. Provisional Patent Application Ser. No. 62/294,041, filed on Feb. 11, 2016, titled: HISTORY COMPARE SOFTWARE, both of which have the inventor in common with the current patent application and the same assignee. The contents of all three of these priority patent applications are incorporated herein by reference.

FIELD OF THE INVENTION

Various embodiments of this invention relate to human machine interface (HMI) technology. Particular embodiments concern methods and software that communicate potentially abnormal behavior of an industrial system to an operator of the system. Certain embodiments display to the operator of the system an alert indicator where a parameter corresponding to a value has passed an operating limit established for the parameter during a particular preceding duration of time.

BACKGROUND OF THE INVENTION

In normal operation of an HMI technology, operators are consistently looking for any abnormal behavior or variable in the process. In many complex industrial processes, however, this is a very time-consuming task and almost an impossibility without the aid from a tool to enable early detection in normal operations. Operators will typically scan the many numerical values on their screen(s) to get an idea of what is going on or perhaps what it about to happen in their process. In many cases, however, there are just too many variables to really make an assessment. Additionally, operators will make use of trending tools to help them diagnose a potential problem or upset with the process. Operators will typically trend values that are recognized as "early detectors" for a potential plant upset. This could still lead to missing variables, however, simply because there are so many. Further, there can be a "slight lag" in the early detectors as well. Needs and/or potential for benefit exist for computer tools that communicate information about the operation of industrial systems to the operator more efficiently. Room for improvement exists over the prior art in these and other areas that may be apparent to a person of skill in the art having studied this document.

SUMMARY OF PARTICULAR EMBODIMENTS OF THE INVENTION

Various embodiments are or include a computerized method, for example, of communicating behavior of an industrial system to an operator of the system. In many embodiments, for instance, the method includes (e.g., using a computer), various acts. In various embodiments, for example, such acts include, for example, displaying to the operator of the system values of multiple different parameters of the system, displaying to the operator of the system an alert indicator for each value of the values that has passed an operating limit established for the parameter during a particular preceding duration of time, or both. In specific embodiments, for example, the alert indicator is or includes shading.

Further, in some such embodiments, the shading is displayed adjacent to the value. Still further, some embodiments include an act of displaying to the operator of the system a plot of the value, for instance, over the particular preceding duration of time. In particular embodiments, for example, the act of displaying to the operator of the system the plot of the value over the particular preceding duration of time is performed when the operator hovers a cursor over the value. Even further, in some embodiments, the plot displays the operating limit established for the parameter. Further still, in some embodiments, the displaying to the operator of the system the alert indicator includes simultaneously displaying to the operator of the system multiple alert indicators for multiple of the values, for instance where the parameter corresponding to the value has passed the operating limit established for the parameter during the particular preceding duration of time. Even further still, in some embodiments, the displaying to the operator of the system the alert indicator includes displaying to the operator of the system alert indicators only for the values where the parameter corresponding to the value has passed the operating limit established for the parameter during the particular preceding duration of time.

Moreover, in particular embodiments, the displaying to the operator of the system the alert indicator includes displaying a first indicator when, (e.g., and only when), the parameter corresponding to the value has exceeded an upper operating limit established for the parameter, displaying a second indicator when, (e.g., and only when), the parameter corresponding to the value has gone below a lower operating limit established for the parameter, or both. Further, in some such embodiments, the first indicator includes shading adjacent to the value, the second indicator includes shading adjacent to the value, or both. Still further, in certain embodiments, the first indicator is displayed on a first side of the value, the second indicator is displayed on a second side of the value, the first side is opposite the second side, or a combination thereof. Further still, in various embodiments, the first side is right of the value, the second side is left of the value, or both.

In various embodiments, the act of displaying to the operator of the system the values of the multiple different parameters of the system includes displaying the values as numbers. Further, in many embodiments, the act of displaying to the operator of the system the values of the multiple different parameters of the system includes displaying the values over a schematic diagram of the industrial system. Still further, in some embodiments, the method includes acts of (e.g., using the computer), prompting to input the particular preceding duration of time, prompting to input the operating limit established for the parameter, or both. Even further, in particular embodiments, the method includes an act of (e.g., using the computer), prompting to input an operating limit percentage for an upper operating limit established for the parameter, calculating the upper operating limit established for the parameter using the operating limit percentage, or both. Even further still, some embodiments include varying intensity of the shading, for example, based on frequency, extent, or duration of passage of the operating limit established for the parameter during the particular preceding duration of time. In some such embodiments, for instance, intensity of the shading is varied by changing at least one of color, brightness, darkness, or size of the shading.

Other specific embodiments include computer programs, for example, that include computer-readable instructions which, when executed by the computer, cause the computer to perform certain acts. Such acts include in some embodiments, for example, simultaneously displaying to an operator of an industrial system values of multiple different parameters of the system. In some embodiments, for example, each of the values is a real-time value, each of the multiple different parameters is a quantitative parameter, or both. Further, various embodiments include displaying to the operator of the system an alert indicator, for example, adjacent to the real-time value, for instance, for each of the values where the quantitative parameter corresponding to the real-time value has passed an operating limit established for the parameter during a particular preceding duration of time. In a number of such embodiments for example, the alert indicator includes shading. Still further, in particular embodiments, the computer program includes computer-readable instructions which, when executed by the computer, cause the computer to display to the operator of the system a plot, for example, of the real-time value, for instance, over the particular preceding duration of time, for example, when the operator hovers a cursor over the real-time value. Even further, in certain embodiments, the display to the operator of the system the plot (e.g., of the real-time value over the particular preceding duration of time) is available for each of the values, for instance, where the quantitative parameter corresponding to the real-time value has passed the operating limit established for the parameter during the particular preceding duration of time.

Still other specific embodiments include various other (e.g., computerized) methods, for instance, of communicating behavior of an industrial system to an operator of the system. In some embodiments, for example, the method includes (e.g., using a computer), displaying to the operator of the system values of multiple different parameters of the system, displaying to the operator of the system a first alert indicator for each value of the values when, (e.g., and only when), the value has exceeded an upper operating limit established for the parameter, for instance, during a particular preceding duration of time, displaying to the operator of the system a second alert indicator for each value of the values when, (e.g., and only when), the value has gone below a lower operating limit established for the parameter, for example, during the particular preceding duration of time, or a combination thereof. In some such embodiments, for example, the first alert indicator is displayed adjacent to the value, the second alert indicator is displayed adjacent to the value, the value is displayed as a number, or a combination thereof. Further, in particular embodiments, the first alert indicator is displayed on a first side of the value, the second alert indicator is displayed on a second side of the value, the first side is opposite the second side, or a combination thereof.

Even further, in certain embodiments, the method includes varying intensity, for example, of the first alert indicator, for instance, based on frequency, extent, or duration of the value exceeding the upper operating limit established for the parameter, for instance, during the particular preceding duration of time. Further still, some embodiments include varying intensity of the second alert indicator, for example, based on frequency, extent, or duration of the value going below the lower operating limit established for the parameter, for instance, during the particular preceding duration of time. In some such embodiments, for example, intensity of the first alert indicator is varied by changing at least one of color, brightness, darkness, or size of the first alert indicator, as examples, intensity of the second alert indicator is varied by changing at least one of color, brightness, darkness, or size of the second alert indicator, as further examples, or both.

Other embodiments include computer systems and computer-readable storage media that contain computer-readable instructions that communicate similar information. Many embodiments provide, for example, as objects or benefits, computer tools that, in whole or in part, communicate information about the operation of industrial systems to the operator more efficiently. In addition, various other embodiments of the invention are also described herein, and other benefits of certain embodiments are described herein or may be apparent to a person of skill in this area of technology.

Figure 1:
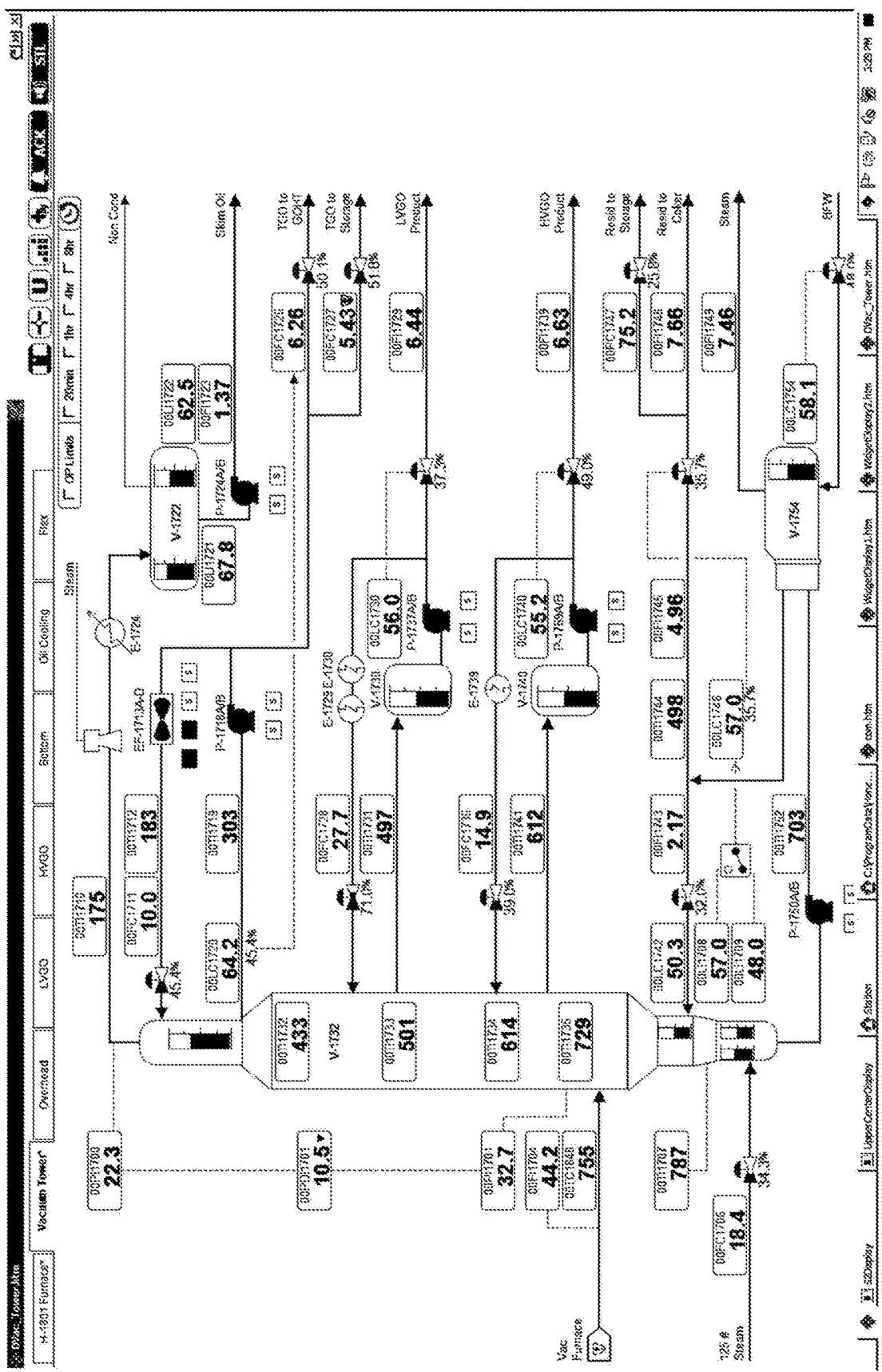
FIG. 1 is an example of a display (e.g., to an operator of an industrial system) of values of multiple different parameters (e.g., of the system) displayed over a schematic diagram of the system.

value that has passed an operating limit on just one end over the particular preceding duration of time.

The drawings provided herewith illustrate, among other things, examples of certain aspects of particular embodiments. Other embodiments may differ. Various embodiments may include aspects shown in the drawings, described in the specification (including the claims), known in the art, or a combination thereof, as examples.

DETAILED DESCRIPTION OF EXAMPLES OF EMBODIMENTS

Figure 9:
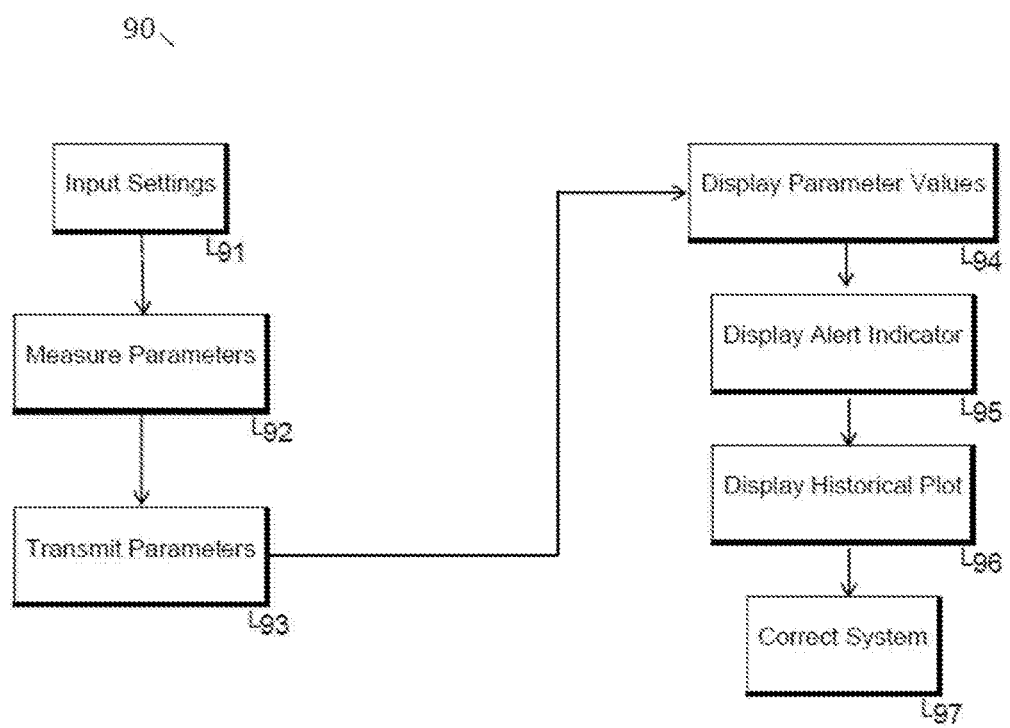
FIG. 9 is a flow chart illustrating an example of a (e.g., computer implemented) method of communicating potentially abnormal behavior of an industrial system (e.g., of FIGS. 1 and 2) to an operator of the system.

This patent application describes, among other things, examples of certain embodiments, and certain aspects thereof. Other embodiments may differ from the particular examples described in detail herein. Various embodiments are or concern HMI technology, software that communicates behavior of an industrial system (e.g., shown in FIGS. 1 and 2) to an operator of the system, and methods (e.g., 90 shown in FIG. 9) associated therewith. Various embodiments include computerized systems and methods of, and computer software for, communicating behavior of an industrial system to an operator of the system. In a number of embodiments, for example, a method (e.g., 90 shown in FIG. 9) includes (e.g., using a computer) acts of displaying to the operator of the system values of multiple different parameters of the system (e.g., act 94), and displaying (e.g., in act 95) to the operator of the system an alert indicator (e.g., that is or includes shading), for example, for each of the values (e.g., displayed in act 94) that has passed an operating limit established for the parameter, for instance, during a particular preceding duration of time. In some embodiments, the method includes displaying to the operator of the system values of multiple different parameters of the system (e.g., act 94), displaying to the operator of the system (e.g., in act 95) a first alert indicator for each value of the values when (e.g., and only when), the value has exceeded an upper operating limit established for the parameter during a particular preceding duration of time, and displaying to the operator of the system (e.g., in act 95) a second alert indicator for each value of the values when (e.g., and only when), the value has gone below a lower operating limit established for the parameter during the particular preceding duration of time.

Various embodiments are or provide a tool that can let the operator know where to look for some potential deviations in the industrial process. In a number of embodiments, the "history compare" tool gives the operator the ability to scan a much larger amount of data and identify variables or values that have moved from steady state during an (e.g., operator-specified) preceding time period, by an (e.g., operator-) specified amount (e.g., percentage), or a combination thereof, as examples. In many embodiments, such a tool can detect abnormal movements or process variability for an operator, for example, before the movements are detectable in variables that the operator may otherwise have been trending. In various embodiments, the tool can also be useful by historizing operating limit exceedances that have occurred in the past and could be an indication of a much larger problem, such as process swings, cyclical behavior, etc.

In a number of embodiments, operating limits define a narrow band that has been identified as a desirable or optimal band for operation. In various embodiments, the operating limits are determined based on safety aspects, product specifications, environmental conditions, economic considerations, efficiencies, etc. In many embodiments, the operating limits define a narrow operating range within a wider alarm range. In the prior art, in normal operations, the operator would scan HMI screens and search for abnormal variables, among other things. In the prior art, however, if certain undesirable scenarios exist (e.g., cyclical conditions), operations (e.g., real-time values) could be viewed as normal in that instant of time. The historical capability of many of the present embodiments, however, let the operator know where to look for potential problems over a period of time. This capability can be invaluable, for example, to prevent major upset conditions. In various embodiments, value movement by a specified percentage, or comparing recent (e.g., measured) values with operating limits, can result in significantly improved process control, for instance.

Further, many specific embodiments include computerized methods (e.g., 90), for example, of communicating potentially abnormal behavior of an industrial system to an operator of the system. Still further, in a number of embodiments, such a method includes an act of (e.g., using a computer, for instance, simultaneously) displaying (e.g., in act 94) to the operator of the system values of multiple different parameters of the system, for instance, wherein each of the values is a real-time value, each of the multiple different parameters is a quantitative parameter, or both. As used herein, a quantitative parameter is a parameter that can be measured or calculated from measured data and that is presented numerically. Examples of quantitative parameters include, but are not limited to, flow rate, temperature, pressure, density, volume, mass, level, speed, enthalpy, humidity, concentration, pH, and viscosity. Even further various such embodiments include an act of (e.g., using the computer) displaying (e.g., in act 95) to the operator of the system an alert indicator, for example, adjacent to the (e.g., real-time) value, for instance, for each of the values where the quantitative parameter corresponding to the (e.g., real-time) value has passed the operating limit established for the parameter during the particular preceding duration of time.

Further still, where multiple different parameters are described herein, in some embodiments, there may be (e.g., at least) a particular number of parameters, for example, at least 2, 3, 4, 5, 6, 7, 8, 9, 10, 11, 12, 15, 20, 25, 30, 40, 50, 60, 70, 80, 100, 125, 150, 200, 250, 300, 400, 500, or more different parameters. In various embodiments, there can be 20-30, 30-50, 50-75, or 50-100 variables or parameters, for example, or more. In some embodiments, for example, a single operator can watch as many as 12 different monitors or screens (e.g., similar to FIG. 2), for instance, each displaying 30-50 parameters, for example. In different embodiments, a single operator can watch 1, 2, 3, 4, 5, 6, 7, 8, 9, 10, 11, 12, 13, 14, 15, 16, 18, or 20 different monitors or screens, as examples. In some embodiments, for example, projection screens are used, for example, or images are projected onto a screen or wall. In a number of embodiments, the variables, system values, or parameters (e.g., shown in FIGS. 1 and 2) are physical measurements, such as pressures, flow rates, temperature, levels (e.g., in tanks), density, concentration, etc. Moreover, as used herein, a real-time value is not necessarily instantaneous, but rather, there may be some lag time that passes between a measurement being taken and the value being displayed. As used herein, a real-time value is the most recent value available or is no more than 10 minutes old. In other embodiments, however, real-time values may be no more than 30, 20, 15, 12, 8, 7, 6, 5 4 3, 2, 1, ½, ¼, ⅙, ⅒, ¹⁄₃₀, or ¹⁄₆₀ minutes old, as examples.

Figure 2:
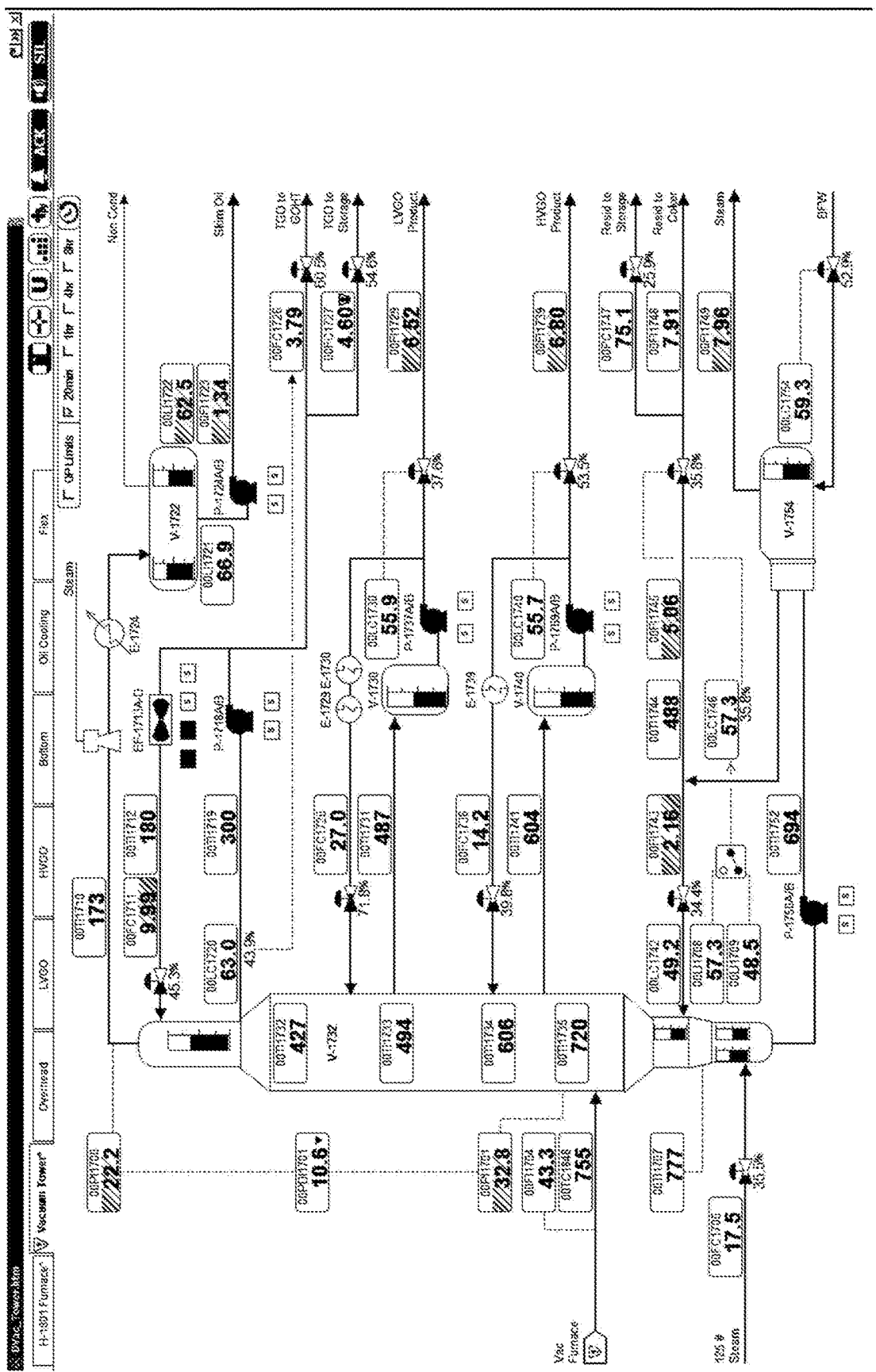
FIG. 2 is the example of the display of FIG. 1 further including alert indicators or shading adjacent to some of the values of the multiple different parameters where the parameter has passed an operating limit established for the parameter during a particular preceding duration of time (e.g., 20-minutes)

Even further, various embodiments may be used with different industrial processes (e.g., the system shown in schematic form in FIGS. 1 and 2). Examples include chemical processes, refining (e.g., oil refining), paper making, mining, etc. Moreover, various embodiments use (e.g., are run on or implemented by) one or more (e.g., general purpose) computers that include components, systems, and software that are known in the art. Distributed control systems (DCS) can be used, for example. Further, various embodiments are displayed on known or general purpose computer display screens. Selection of appropriate computer hardware, software applications, computer peripherals, computer-readable storage media, etc., is considered to be within the skill of a person of ordinary skill in the art. In addition, as used herein, "adjacent" unless stated otherwise, when referring to displaying on a computer screen, means within five percent of an overall dimension of the screen (e.g., shown in FIG. 2). In some embodiments, however, where the word "adjacent" is used herein, the alert indicator, for example, can be within 1, 2, 3, 4, 6, 7, 8, 9, or 10 percent of an overall dimension of the screen, for instance, from the (e.g., real time) value.

In some such embodiments, the displaying (e.g., act 95) to the operator of the system the alert indicator adjacent to the (e.g., real-time) value includes simultaneously displaying to the operator of the system multiple alert indicators for multiple of the values where the quantitative parameter corresponding to the (e.g., real-time) value has passed (e.g., exceeded an upper operating limit or dropped below a lower operating limit), for instance, during the particular preceding duration of time, the operating limit established for the parameter (e.g., as shown in FIG. 2). Further, in particular embodiments, the displaying (e.g., in act 95) to the operator of the system the alert indicator (e.g., adjacent to the real-time value) includes simultaneously displaying to the operator of the system a first number of alert indicators for the first number of the values where the quantitative parameter corresponding to the real-time value, for example, has passed the operating limit established for the parameter, for instance, during the particular preceding duration of time. Still further, in some embodiments, the first number is less than a total number of the multiple different parameters of the system (e.g., as shown in FIG. 2). In this context, the total number is the actual number of different parameters, for example, at least ten in some embodiments. Other embodiments, however, may differ in number.

In a number of embodiments, the displaying (e.g., in act 95), for instance, to the operator of the system, the alert indicator, for example, adjacent to the (e.g., real-time) value, includes displaying (e.g., on a computer screen) alert indicators only for the values (e.g., displayed in act 94) where the (e.g., quantitative) parameter corresponding to the (e.g., real-time) value has passed the operating limit established for the parameter, for instance, during the particular preceding duration of time (e.g., as shown in FIG. 2). Further, in various embodiments, the displaying (e.g., in act 95) to the operator of the system the alert indicator, for instance, adjacent to the real-time value, includes displaying a gradient or shading, for example, adjacent to the real-time value. In FIG. 2, this (e.g., shading) is illustrated by cross hatching, for example. In some embodiments, the shading may be colored, for example. Still further, in some embodiments, the operator can select certain of the values (e.g., real-time values) to watch that remain on the screen (e.g., at the top of the screen), for instance, when the remainder of the information on the screen changes.

Figure 7:
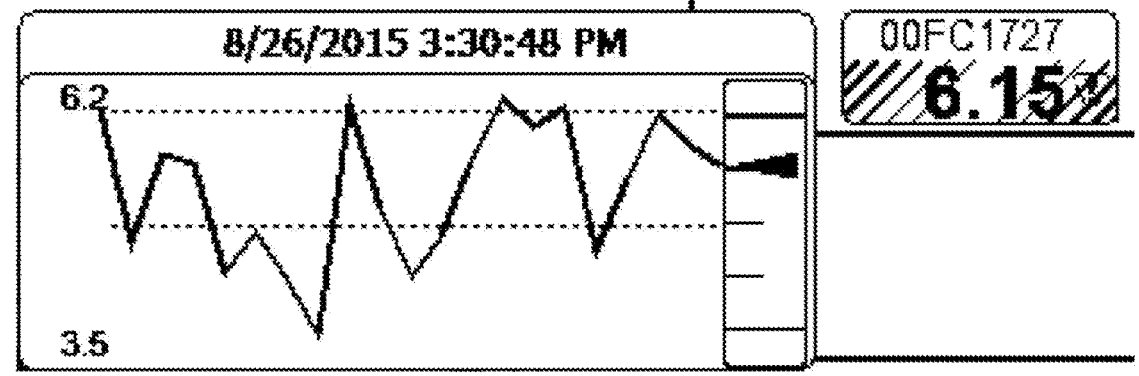
FIG. 7 is even another detail view of part of a display (e.g., similar to the display of FIG. 2) showing a plot of a (e.g., real time) value that has passed its operating limit at both ends over the particular preceding duration of time (e.g., 20-minutes)

In some embodiments, the displaying (e.g., in act 95), for instance, to the operator of the system, the alert indicator (e.g., adjacent to the real-time value) includes displaying a first indicator when (e.g., when and only when) the parameter corresponding to the (e.g., real-time) value has exceeded an upper operating limit established for the parameter, and displaying a second indicator when (e.g., when and only when) the parameter corresponding to the value has gone below a lower operating limit established for the parameter (e.g., within the particular preceding duration of time). Further, in some such embodiments, the first indicator includes shading, for instance, adjacent to the (e.g., real-time) value, the second indicator includes shading, for instance, adjacent to the value, or both. Still further, in a number of embodiments, the first indicator (e.g., shading) is displayed on a first side of the real-time value (e.g., as shown with cross hatching in FIGS. 2-6), the second indicator (e.g., shading) is displayed on a second side of the real-time value (e.g., as shown with cross hatching in FIGS. 2, 7, and 8), or both. Even further, in some embodiments, the first side is opposite the second side (e.g., as shown in FIGS. 2 and 7). For instance, in particular embodiments, the first side is right of the (e.g., real-time) value, the second side is left of the (e.g., real-time value), or both (e.g., as shown). Other embodiments can be vice versa. In still other embodiments, the first side is above the value, the second side is below the value, or both, or vice versa.

In many embodiments, the (e.g., real-time) value is displayed (e.g., in act 94) as a number (e.g., as shown in FIGS. 1-8 and 10-12). In other embodiments, however, the (e.g., real-time) value is displayed as a gage reading or graphically. In some embodiments, for example, the (e.g., real-time) value is displayed (e.g., in act 94) as a gage when the (e.g., real-time value) is within normal limits (e.g., within the operating limit or limits), but is displayed as a number when the (e.g., real-time) value is outside of the normal limits or operating limits, as another example. Moreover, in some embodiments, a particular value is displayed (e.g., in act 94 or 95) in a manner that differentiates other values when the particular value is outside of the normal limits or operating limits. For example, in some embodiments, the (e.g., real-time) value is displayed in a different color, in bold, or in a larger font size, as examples, when the (e.g., real-time) value is outside of the normal limits or operating limits. Still further, in many embodiments, each of the values is displayed (e.g., in act 94) over a schematic diagram of the industrial system (e.g., as shown in FIGS. 1 and 2), for instance, to help the operator understand the significance of each value. Even further, in some embodiments, each of the values is displayed (e.g., in act 94, 95, or both) with (e.g., below or to the right of) a description or designation of the value, parameter, location, units of measurement, etc.

Some embodiments include, for example, varying intensity (e.g., in act 95), for instance, of the alert indicator or shading (e.g., shown in FIGS. 2-8 and 10-12), for example, based on frequency, extent, duration, or a combination thereof, of passage of the operating limit established for the parameter, for instance, during the particular preceding duration of time. Further, in particular embodiments, intensity of the alert indicator or shading is varied, for example, by changing (e.g., at least one of) color, brightness, darkness, or size, for instance, of the alert indicator or shading. Frequency may be, for example, the number of times that the parameter has passed the operating limit during the particular preceding duration of time. Further, extent may be based on how far the parameter has passed the operating limit during the particular preceding duration of time. Still further, duration, may be how long the parameter has remained past the operating limit during the particular preceding duration of time. Some embodiments may use more than one of frequency, extent, and duration to determine intensity. Further still, some embodiments base intensity (e.g., in part) on how recently, for example, within the particular preceding duration of time, the parameter passed the operating limit. Further, in various embodiments, color can be changed, for example, from yellow to red to indicate greater intensity. Still further, in some embodiments, brightness of color or darkness (e.g., of gray shading) may be used to indicate intensity (e.g., in act 95). Further still, in some embodiments, size, such as height, width, or both, of shading, or another alert indicator, may be varied to show intensity.

Even further, some embodiments include, for example, varying intensity (e.g., in act 95), for instance, of the first alert indicator (e.g., shading), for example, based on frequency, extent, or duration (e.g., or a combination thereof), for instance, of the value exceeding the upper operating limit established for the parameter, for instance, during the particular preceding duration of time. Even further still, some embodiments include varying intensity, for example, of the second alert indicator (e.g., shading), for instance, based on frequency, extent, or duration (e.g., or a combination thereof), for example, of the value going below the lower operating limit established for the parameter, for instance, during the particular preceding duration of time. In a number of embodiments, intensity of the first alert indicator is varied (e.g., in act 95) by changing at least one of color, brightness, darkness, or size of the first alert indicator, intensity of the second alert indicator is varied by changing at least one of color, brightness, darkness, or size of the second alert indicator, or both. In various embodiments, intensity indications (e.g., in act 95) can help the operator to identify important parameters of the many parameters that are displayed (e.g., in act 94 and/or 95). Intensity may help the operator to quickly distinguish parameters that are varying repeatedly, by a large variation, or for extended periods of time, in one or both directions, and may help the operator distinguish the significance of different indications.

Figure 8:
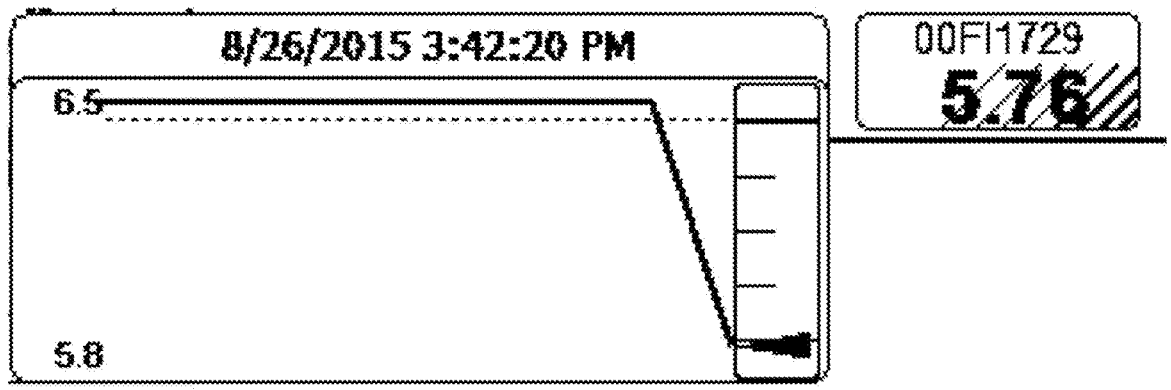
FIG. 8 is a further detail view of part of a display (e.g., similar to the display of FIG. 2) showing a plot of a (e.g., real time) value that has passed an operating limit over the particular preceding duration of time (e.g., 8-hours)

Still further, in some embodiments, the method (e.g., 90) includes an act (e.g., 96) of (e.g., using the computer) displaying to the operator of the system a plot (e.g., a two-dimensional graph with the x axis being time) of the value (e.g., the real-time value, for instance, displayed in act 94), for instance, over the particular preceding duration of time. FIGS. 3-8 and 10-12 illustrate examples of such plots. For example, in certain embodiments, (e.g., for each of the values) the act (e.g., 96) of displaying to the operator of the system the plot of the (e.g., real-time) value over the particular preceding duration of time is performed (e.g., one of the historical plots of FIGS. 3-8 or 10-12 is displayed) when the operator hovers a cursor (e.g., using a pointer such as a mouse) over the (i.e., displayed) (e.g., real-time) value. In various embodiments, for example, using an embodiment of the tool, an operator is shown (e.g., via a display such as shown in FIG. 2) high or low variability (e.g., in act 95) by shading the variables on the left side (e.g., indicating a low variability, for instance, as shown in FIGS. 3-6), or on the right side of the variable (e.g., indication a high variability, for instance, as shown in FIG. 8) or shading on both sides, (i.e., indicating the variable varied both low and high, for instance, as shown in FIG. 7), for example, for the specified (e.g., by the operator, for instance, in act 91) amount of history selected. In a number of embodiments, a spark trend or sparkline is available to the operator by hovering over the variable (e.g., as shown in FIGS. 3-8 and 10-12). In some embodiments, a trend object (e.g., even if small) can show data (e.g., a small amount of data) and its variability. In various embodiments, this enables the operator to see when the variability occurred, the operator can determine the degree of variability, or both, as examples (e.g., in act 96, as shown in FIGS. 3-8 and 10-12, or both). Even further, in various embodiments, the plot (e.g., displayed in act 96) displays the operating limit or limits. FIGS. 3-8 and 10-12 illustrate examples. In some embodiments, for example, the plot (e.g., displayed in act 96) displays the upper operating limit (e.g., shown in FIGS. 4, 6-8, and 10-12), the plot displays the lower operating limit (e.g., shown in FIGS. 3-7), or both (e.g., shown in FIGS. 4, 6, and 7). In a number of embodiments, such limits are shown as a horizontal line or broken line on the plot, as examples (e.g., as shown).

In various embodiments, the act (e.g., 96) of displaying (e.g., to the operator of the system) the plot of the (e.g., real-time) value over the particular preceding duration of time is available to be performed for each of the values (e.g., shown on FIGS. 1 or 2) where the (e.g., quantitative) parameter corresponding to the (e.g., real-time) value has passed the operating limit established for the parameter (e.g., in act 91), for example, during the particular preceding duration of time. In some embodiments, the act (e.g., 96) of displaying to the operator of the system the plot of the value over the particular preceding duration of time is available to be performed for each of the values (e.g., whether or not the parameter corresponding to the value has passed the operating limit established for the parameter during the particular preceding duration of time). In other embodiments, however, the act of displaying to the operator of the system the plot of the (e.g., real-time) value over the particular preceding duration of time is available to be performed only for the values (e.g., indicated by the alert indicator displayed in act 95 or cross hatching shown in FIG. 2) where the (e.g., quantitative) parameter corresponding to the (e.g., real-time) value has passed the operating limit established for the parameter during the particular preceding duration of time.

Additionally, in many embodiments, the method (e.g., 90) includes an act (e.g., 91) of (e.g., using the computer) prompting (e.g., the operator), for instance, to input the particular preceding duration of time (e.g., for purposes of displaying the alert indicator in act 95, displaying the historical plot in act 96, or both). Further, some embodiments include an act (e.g., 91) of (e.g., using the computer) prompting (e.g., the operator) to select the particular preceding duration of time from multiple discrete alternatives. Examples of such discrete alternatives include 5, 10, 15, 20, 30, or 45 minutes, or 1, 2, 3, 4, 6, 8, 10, 12, 18, 24, 30 or 48 hours, as examples. A particular example provides four options of 20 minutes, 1 hour, 4 hours, or 8 hours, for instance. For example, in FIG. 2, a 20 minutes option has been selected and the gradient shapes indicate a PV exceeded the tolerance or operating limit. In contrast, in FIG. 1, no option has been selected. Other embodiments provide (e.g., the operator with) 2, 3, 5, 6, 7, 8, 9, 10, or 12 options, as other examples. Further still, in some embodiments, the particular preceding duration of time (e.g., input in act 91) is divided into multiple intervals of time and, in particular embodiments, values of the parameter within each interval of time are averaged to obtain an overall value for that interval (e.g., for displaying a historical plot in act 96). Such intervals can be, for example, 1 minutes, 6 minutes, or an hour long, as examples. In other embodiments, the intervals can be 1, 2, 3, 4, 5, 6, 8, 10, 15, 20, 30, or 45 seconds, or 2, 3, 4, 5, 8, 10, 15, 20, 30, 45, or 90 minutes, as other examples. A particular example provides four options of: 20 minutes with 20 data points with 1-minute average per point, 1 hour with 10 data points with 6-minute average per point, 4 hours with 40 data points with 6-minute average per point, or 8 hours with 8 data points with 1-hour average per point, for instance. Still further, various embodiments include an act (e.g., 91) of (e.g., using the computer) inputting (e.g., from the operator) the particular preceding duration of time. Further still, various embodiments include an act (e.g., 91) of (e.g., using the computer) inputting (e.g., from the operator) the particular interval of time.

Figure 3:
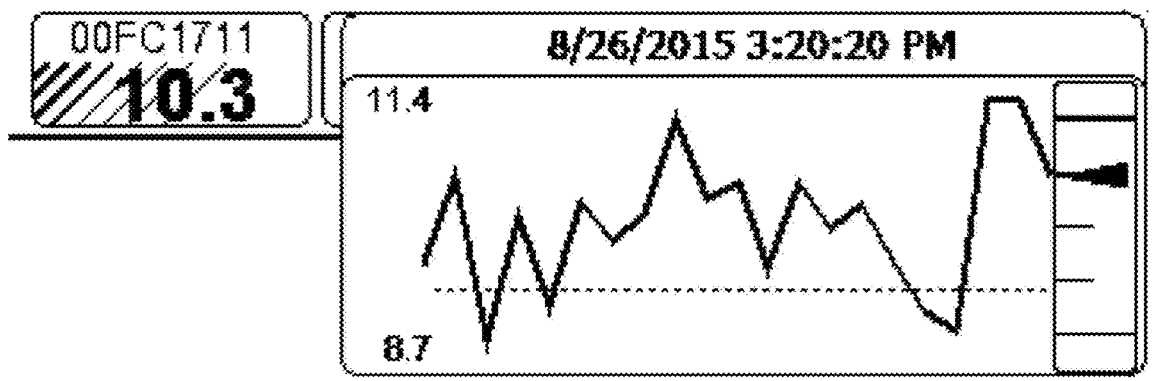
FIG. 3 is a detail view of part of a display (e.g., similar to the display of FIG. 2) showing a plot of a (e.g., real time) value (e.g., that has passed an operating limit) over the particular preceding duration of time.
Figure 4:
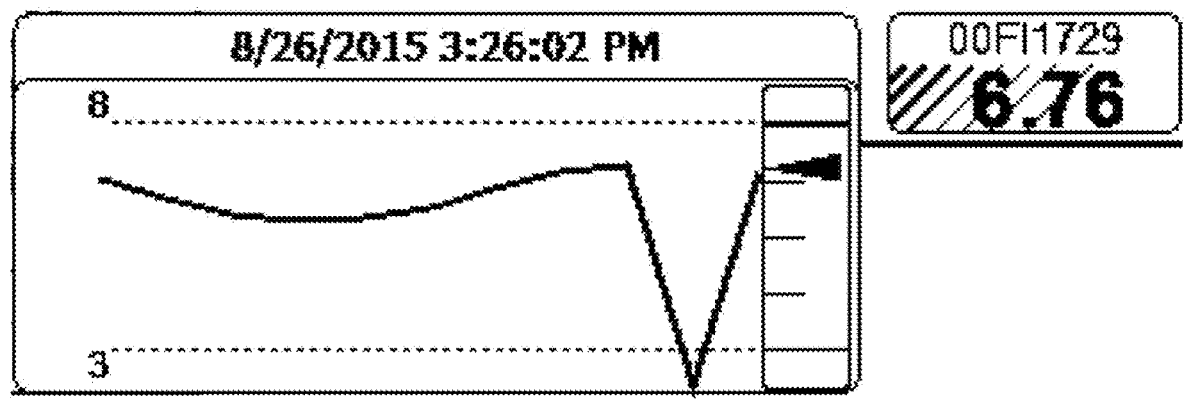
FIG. 4 is another detail view of part of a display (e.g., similar to the display of FIG. 2) showing a plot of a (e.g., real time) value (e.g., that has passed an operating limit) over the particular preceding duration of time.
Figure 5:
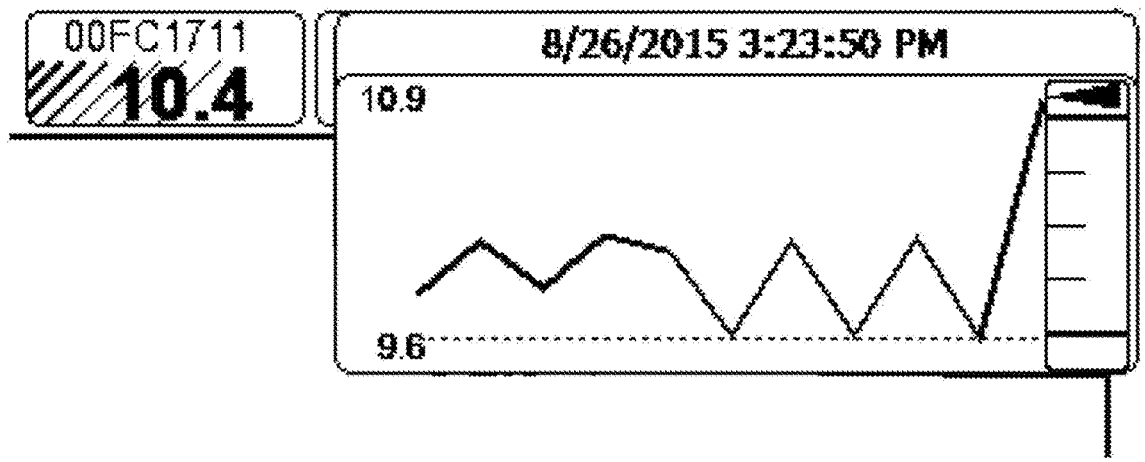
FIG. 5 is yet another detail view of part of a display (e.g., similar to the display of FIG. 2) showing a plot of a (e.g., real time) value (e.g., that has passed an operating limit) over the particular preceding duration of time (e.g., 1-hour)
Figure 6:
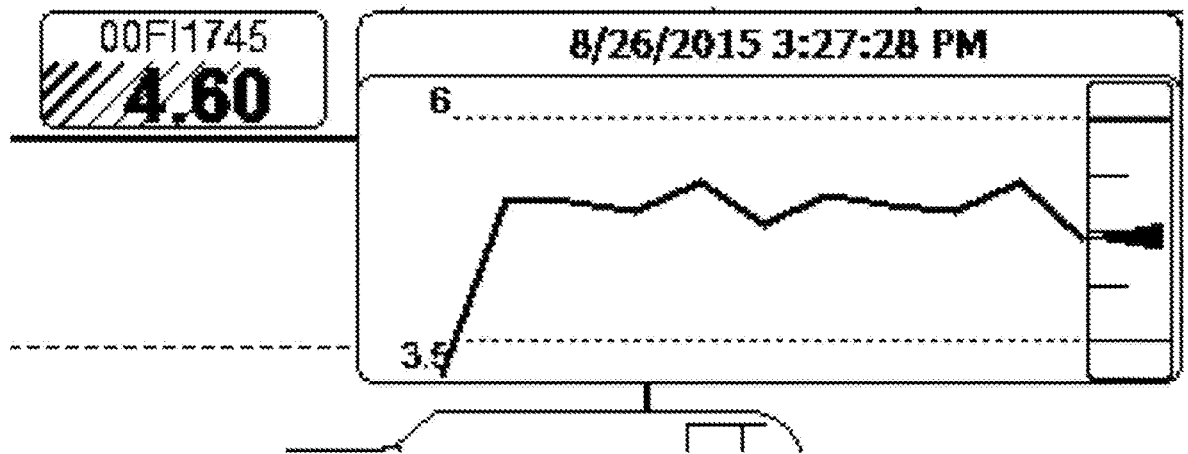
FIG. 6 is still another detail view of part of a display (e.g., similar to the display of FIG. 2) showing a plot of a (e.g., real time) value (e.g., that has passed an operating limit) over the particular preceding duration of time (e.g., 4-hours)
Figure 10:
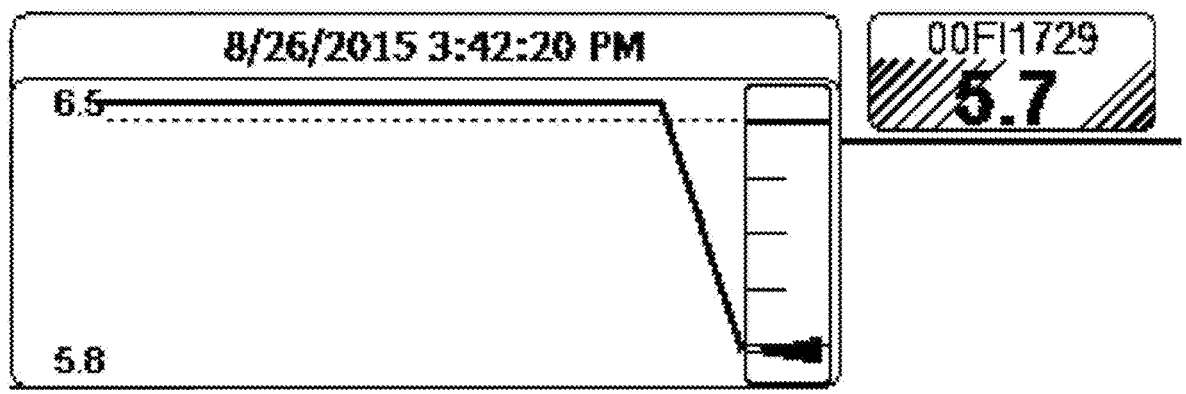
FIG. 10 is a further detail view of part of a display (e.g., similar to the display of FIG. 2) showing a plot of a (e.g., real time) value that has passed operating limits on both ends over the particular preceding duration of time (e.g., 20-minutes)
Figure 11:
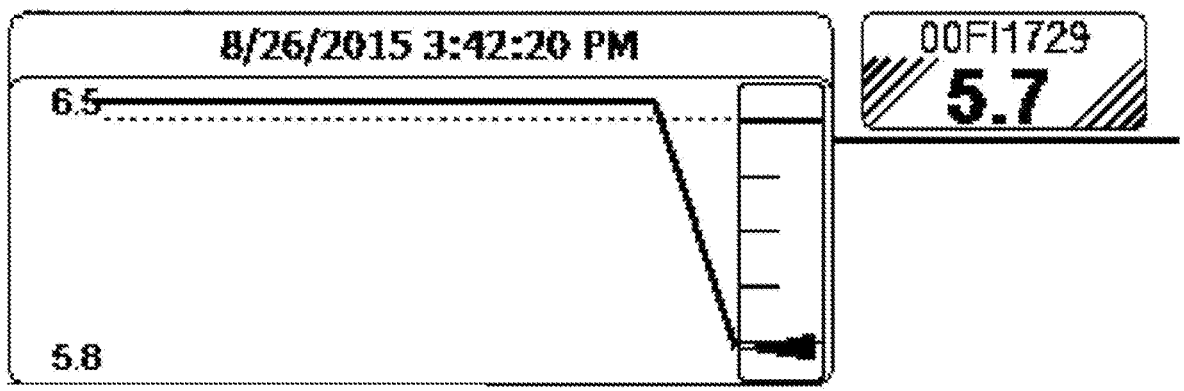
FIG. 11 is another detail view of part of a display (e.g., similar to the display of FIG. 2) showing a plot of a (e.g., real time) value that has passed operating limits on both ends over the particular preceding duration of time.
Figure 12:
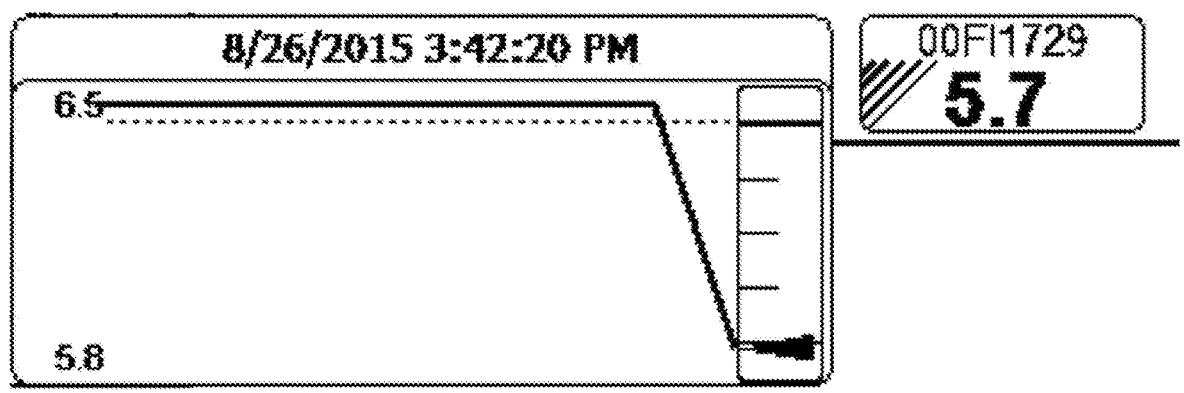
FIG. 12 is a detail view of part of a display (e.g., similar to the display of FIG. 2) showing a plot of a (e.g., real time)

In some embodiments, the operator can select (e.g., in act 91) an OP Limits option which, when selected, compares collected data (e.g., averages) against the point's operating limits. On the other hand, in some embodiments, when the OP Limits option is not selected, the data is compared against a PV tolerance set, for example, as a custom property in the History Compare shape. Further, in a number of embodiments, once an option is selected (e.g., in act 91), each shape that violates the PV tolerance (or Operating Limit) will show up (e.g., in act 95) with a gradient (e.g., as shown in FIGS. 2-8 and 10-12). In some embodiments, for example, a left gradient indicates that the PV exceeded the low end, a right gradient indicates the high end was exceeded, and a left and right gradient indicates that both ends were exceeded. Still further, in some embodiments, a mouse held over any shape with a gradient, for instance, will show (e.g., in act 96) a graph, for example, displaying the data point averages that were collected. FIG. 3 illustrates an example (e.g., of act 96) of one or more of the 20 one-minute averages exceeding a PV tolerance of 10 percent. In FIG. 3, the 20-minute option was selected using PV tolerance and the PV exceeded the low end multiple times in the last 20 minutes. In this example, the tolerance is shown as the dashed line, and the current process value is shown to the right of the graph. Even further, when the Operating Limits option is selected, in some embodiments, the view of the graph is similar but shows the history of the PV in regards to its limits. FIG. 4 uses 00FI1729 as an example of this. In FIG. 4, the 20-minute option has been selected using Operating Limits and the PV exceeded the low limit one time in the last 20 minutes. In this example, the high limit for the point is 8 and the low limit is 3 and they are indicated by dashed lines. The graph, in this example (e.g., of act 96), shows that recently the process value was below its low limit. FIGS. 5-8 give various examples of different options that can be selected for certain embodiments. In FIG. 5, for instance, the 1-hour option has been selected not using PV tolerance, in FIG. 6 the 4-hour option using Operating Limits has been selected, in FIG. 7, the 20-minute option using PV Tolerance has been selected and in this situation, both ends were exceeded in the last 20 minutes, and in FIG. 8, the 8-hour option using PV Tolerance has been selected, as examples. FIG. 10 illustrates, as another example, a dual-end 20-minute option using PV Tolerance. In this situation, one end exceeded in the last 20 minutes a majority of the time and the other end exceeded in the last 20 minutes half of the time. In contrast, in FIG. 11, for instance, both ends exceeded about equally. Further, in FIG. 12, just one end exceeded, as another example.

Moreover, in many embodiments, the method (e.g., 90) includes an act (e.g., 91) of (e.g., using the computer), prompting (e.g., the operator) to input the operating limit established for the parameter (e.g., values of which are displayed in act 94). In some embodiments, for example, the method includes (e.g., using the computer) inputting (e.g., from the operator) an operating limit (e.g., established for the parameter), that is input (e.g., in act 91) as an actual value of the parameter. For instance, where the parameter is pressure, the operating limit may be input in pounds per square inch, pascals, or atmospheres, as examples, or where the parameter is temperature, the operating limit may be input (e.g., in act 91) in degrees (e.g., F. or C.), for example. Further, some embodiments include an act of (e.g., using the computer) prompting (e.g., the operator) to select (e.g., in act 91) the operating limit established for the parameter from multiple discrete alternatives. Even further, various embodiments include an act (e.g., 91) of (e.g., using the computer) inputting (e.g., from the operator) the operating limit established for the parameter. Moreover, certain embodiments include an act of (e.g., using the computer) prompting (e.g., the operator) to input (e.g., in act 91) the upper operating limit established for the parameter, an act of (e.g., using the computer) inputting (e.g., from the operator) the upper operating limit established for the parameter, or both. Similarly, certain embodiments include an act of (e.g., using the computer) prompting (e.g., the operator) to input (e.g., in act 91) the lower operating limit established for the parameter, an act of (e.g., using the computer) inputting from the operator the lower operating limit established for the parameter, or both. Still further, particular embodiments, include an act of (e.g., using the computer) prompting (e.g., the operator) to input (e.g., in act 91) an operating limit percentage for the upper operating limit established for the parameter, an act of (e.g., using the computer) calculating (e.g., in act 91) the upper operating limit established for the parameter, for example, using the operating limit percentage, or both. Similarly, certain embodiments include an act of (e.g., using the computer) prompting (e.g., the operator) to input (e.g., in act 91) an operating limit percentage for the lower operating limit established for the parameter, an act of (e.g., using the computer) calculating the lower operating limit established for the parameter, for instance, using the operating limit percentage, or both. In some embodiments, the operator, for instance, can input (e.g., in act 91) one operating limit percentage for both the upper and lower limits, as another example. Further, in some embodiments, the operator, for instance, can adjust (e.g., in act 91) the operating limit or limits of multiple or all of the values at once, for example, by adjusting the operating limit percentage. Moreover, in some embodiments, the operator, for instance, can set (e.g., in act 91) some, multiple, or all current (e.g., real-time) values at the center of the operating limits, for example, when the plant or industrial process is operating well, thus defining the normal operating values from which the operating limits are calculated (e.g., using the operating limit percentage).

Further, many embodiments (e.g., method 90) include (e.g., simultaneously) measuring (e.g., in act 92) the multiple (e.g., at least ten, at least twenty, etc.) different parameters of the system, transmitting (e.g., in act 93) the values or parameters (e.g., to the computer) for displaying (e.g., in act 94), for instance, to the operator of the system, or both. Furthermore, various embodiments include an act (e.g., 97) of correcting the potentially abnormal behavior of the industrial system. In some embodiments, this (e.g., act 97) may be done using the computer, but in other embodiments, certain corrective action may be performed by the operator, or by others, for example, without using the computer to take the corrective action. In various embodiments, for example, the act (e.g., 97) of correcting the potentially abnormal behavior of the industrial system includes adjusting at least one flow rate in the industrial system, adjusting at least one level (e.g., a liquid level in a tank) in the industrial system, adjusting at least one pressure in the industrial system, or a combination thereof, as examples. In different embodiments, such corrective actions (e.g., of act 97) can be computer implemented or otherwise. Further, in some embodiments, the act (e.g., 97) of correcting the potentially abnormal behavior of the industrial system includes adjusting a control scheme in the industrial system.

Other embodiments include a computer-readable medium that includes computer-readable instructions which, when executed by the computer, cause the computer to simultaneously display, for example, to an operator of an industrial system, values of multiple different parameters of the system (e.g., in act 94), for instance, wherein each of the values is a real-time value and wherein each of the multiple different parameters is a quantitative parameter, and display to the operator of the system an alert indicator (e.g., in act 95), for instance, adjacent to the real-time value (e.g., displayed in act 94), for example, for each of the values where the quantitative parameter corresponding to the real-time value has passed an operating limit established for the parameter (e.g., input in act 91) during a particular preceding duration of time. Further, in various embodiments, such a computer-readable medium can include computer-readable instructions that, when executed by the computer, cause the computer to perform other acts described herein. Still other embodiments include various computer programs and computer systems that include computer-readable instructions which, when executed by the computer, cause the computer to perform similar acts or combinations of acts, as further examples.

Specific embodiments include various computerized systems and methods (e.g., 90) of communicating behavior of an industrial system to an operator of the system. In particular embodiments, for example, the method includes, using a computer, acts of displaying to the operator of the system values of multiple different parameters of the system (e.g., act 94), and displaying to the operator of the system an alert indicator (e.g., act 95, for example, shading), for instance, for each of the values that has passed an operating limit established for the parameter, for example, during a particular preceding duration of time. In a number of embodiments, the method further includes an act (e.g., 96) of displaying to the operator of the system a plot of the value, for example, over the particular preceding duration of time. Further, in some embodiments, for each of the values, the act (e.g., 96) of displaying to the operator of the system the plot of the value, for instance, over the particular preceding duration of time, is performed when the operator hovers a cursor over the value. Further, other specific embodiments include a computerized method (e.g., 90) of communicating behavior of an industrial system to an operator of the system, that includes, for example, using a computer, acts of displaying to the operator of the system values of multiple different parameters of the system (e.g., act 94), and displaying to the operator of the system a plot, for instance, over a particular preceding duration of time (e.g., act 96), for example, for at least one of the values that has passed an operating limit established for the parameter during the particular preceding duration of time. In some such embodiments, for further example, for the at least one of the values, the act (e.g., 96) of displaying to the operator of the system the plot, for instance, over the particular preceding duration of time, is performed specifically when the operator hovers a cursor over the value.

Still further, in some embodiments, a computerized method of communicating behavior of an industrial system to an operator of the system includes (e.g., using a computer), acts of displaying to the operator of the system values of multiple different parameters of the system (e.g., act 94), displaying to the operator of the system an alert indicator (e.g., shading), for example, for each of the values that has passed an operating limit established for the parameter, for instance, during a particular preceding duration of time (e.g., act 95), and displaying to the operator of the system a plot, for example, over the particular preceding duration of time, for instance, for one of the values that has passed the operating limit established for the parameter during the particular preceding duration of time (e.g., act 96), as another example. Even further specific examples include a (e.g., computerized) method of communicating behavior of an industrial system to an operator of the system, the method that includes (e.g., using a computer), acts of displaying to the operator of the system values of multiple different parameters of the system (e.g., act 94), displaying to the operator of the system an alert indicator (e.g., shading) for each of the values that has passed an operating limit established for the parameter, for instance, during a particular preceding duration of time (e.g., act 95), and when the operator hovers a cursor over one of the values that has passed the operating limit established for the parameter during the particular preceding duration of time, displaying to the operator of the system a plot, for example, of the one of the values over the particular preceding duration of time (e.g., act 96).

Moreover, specific embodiments include various (e.g., computerized) methods (e.g., 90) of communicating potentially abnormal behavior of an industrial system to an operator of the system that includes acts of (e.g., using a computer, for instance, simultaneously) displaying to the operator of the system values of multiple different parameters of the system (e.g., wherein each of the values is a real-time value, wherein each of the multiple different parameters is a quantitative parameter, or both, for example, act 94), and (e.g., using the computer), displaying to the operator of the system an alert indicator (e.g., shading, for instance, adjacent to the real-time value) for each of the values where the quantitative parameter corresponding to the real-time value has passed an operating limit established for the parameter, for instance, during a particular preceding duration of time (e.g., act 95). Further, in some such embodiments, the method further includes an act of (e.g., using the computer), displaying to the operator of the system a plot of the (e.g., real-time) value over the particular preceding duration of time (e.g., act 96). Still further, in some such embodiments, for each of the values, the act (e.g., 96) of displaying to the operator of the system the plot (e.g., of the real-time value over the particular preceding duration of time) is performed when the operator hovers a cursor over the real-time value.

Even further, in other embodiments, a method (e.g., 90) of communicating potentially abnormal behavior of an industrial system to an operator of the system includes (e.g., using a computer), simultaneously displaying to the operator of the system values of multiple different parameters of the system, for instance, wherein each of the values is a real-time value and wherein each of the multiple different parameters is a quantitative parameter (act 94), and (e.g., using the computer), displaying to the operator of the system a plot (e.g., of the real-time value over a particular preceding duration of time) for one of the values where the quantitative parameter (e.g., corresponding to the real-time value) has passed an operating limit established for the parameter, for instance, during the particular preceding duration of time (e.g., act 96). Even further still, in some embodiments, a (e.g., computerized) method of communicating potentially abnormal behavior of an industrial system to an operator of the system includes acts of (e.g., using a computer), simultaneously displaying to the operator of the system values of multiple different parameters of the system, for example, wherein each of the values is a real-time value and wherein each of the multiple different parameters is a quantitative parameter (e.g., act 94), (e.g., using the computer), displaying to the operator of the system an alert indicator, for instance, adjacent to the real-time value, for example, for each of the values where the quantitative parameter corresponding to the real-time value has passed an operating limit established for the parameter during a particular preceding duration of time (e.g., act 95), and specifically when the operator hovers a cursor over the real-time value, displaying to the operator of the system a plot of the real-time value over the particular preceding duration of time for each of the values where the quantitative parameter corresponding to the real-time value has passed the operating limit established for the parameter during the particular preceding duration of time (e.g., act 96).

Other embodiments include an apparatus or various methods of obtaining or providing an apparatus or information, for instance, that include a novel combination of the features described herein. Even further embodiments include a at least one means for accomplishing at least one functional aspect described herein. The subject matter described herein includes various means for accomplishing the various functions or acts described herein (e.g., of method 90) or that are apparent from the structure and acts described. Each function described herein is also contemplated as a means for accomplishing that function, or where appropriate, as a step for accomplishing that function. Moreover, various embodiments include certain (e.g., combinations of) aspects described herein. All novel combinations are potential embodiments. Some embodiments may include a subset of elements described herein and various embodiments include additional elements as well.

Further, various embodiments of the subject matter described herein include various combinations of the acts, structure, components, and features described herein, shown in the drawings, described in any documents that are incorporated by reference herein, or that are known in the art. Moreover, certain procedures can include acts such as manufacturing, obtaining, or providing components that perform functions described herein or in the documents that are incorporated by reference. Further, as used herein, the word "or", except where indicated otherwise, does not imply that the alternatives listed are mutually exclusive. Even further, where alternatives are listed herein, it should be understood that in some embodiments, fewer alternatives may be available, or in particular embodiments, just one alternative may be available, as examples.

What is claimed is:

1. A computerized method of communicating behavior of an industrial system to an operator of the system, the method comprising acts of:
    measuring multiple different parameters of the system;
    transmitting values of the multiple different parameters to a computer for displaying to the operator of the system;
    using the computer, displaying to the operator of the system the values of the multiple different parameters of the system; and
    using the computer, displaying to the operator of the system an alert indicator for each value of the values that has passed an operating limit established for the parameter during a particular preceding duration of time, wherein:
    the alert indicator comprises shading;
    the displaying to the operator of the system the alert indicator comprises:
        displaying a first indicator when, and only when, the parameter corresponding to the value has exceeded an upper operating limit established for the parameter; and
        displaying a second indicator when, and only when, the parameter corresponding to the value has gone below a lower operating limit established for the parameter;
    the first indicator is displayed on a first side of the value;
    the second indicator is displayed on a second side of the value;
    the first side is opposite the second side;
    the first side is right of the value; and
    the second side is left of the value.

2. The method of claim 1 wherein the shading is displayed adjacent to the value.

3. The method of claim 1 further comprising an act of displaying to the operator of the system a plot of the value over the particular preceding duration of time.

4. The method of claim 3 wherein the act of displaying to the operator of the system the plot of the value over the particular preceding duration of time is performed when the operator hovers a cursor over the value.

5. The method of claim 3 wherein the plot displays the operating limit established for the parameter.

6. The method of claim 1 wherein the displaying to the operator of the system the alert indicator comprises simultaneously displaying to the operator of the system multiple alert indicators for multiple of the values where the parameter corresponding to the value has passed the operating limit established for the parameter during the particular preceding duration of time.

7. The method of claim 1 wherein the displaying to the operator of the system the alert indicator comprises displaying to the operator of the system alert indicators only for the values where the parameter corresponding to the value has passed the operating limit established for the parameter during the particular preceding duration of time.

8. The method of claim 1 wherein:
    the first indicator comprises shading adjacent to the value; and
    the second indicator comprises shading adjacent to the value.

9. The method of claim 1 wherein the act of displaying to the operator of the system the values of the multiple different parameters of the system includes displaying the values as numbers.

10. The method of claim 1 wherein the act of displaying to the operator of the system the values of the multiple different parameters of the system includes displaying the values over a schematic diagram of the industrial system.

11. The method of claim 1 further comprising acts of, using the computer:
    prompting to input the particular preceding duration of time; and
    prompting to input the operating limit established for the parameter.

12. The method of claim 1 further comprising:
    an act of, using the computer, prompting to input an operating limit percentage for an upper operating limit established for the parameter; and
    an act of, using the computer, calculating the upper operating limit established for the parameter using the operating limit percentage.

13. The method of claim 1 further comprising:
varying intensity of the shading based on frequency, extent, or duration of passage of the operating limit established for the parameter during the particular preceding duration of time; wherein:
intensity of the shading is varied by changing at least one of color, brightness, darkness, or size of the shading.

14. The method of claim 1 further comprising an act of correcting abnormal behavior of the industrial system.

15. The method of claim 1 wherein:
the displaying to the operator of the system the alert indicator comprises simultaneously displaying to the operator of the system multiple alert indicators for multiple of the values where the parameter corresponding to the value has passed the operating limit established for the parameter during the particular preceding duration of time;
the displaying to the operator of the system the alert indicator comprises displaying to the operator of the system alert indicators only for the values where the parameter corresponding to the value has passed the operating limit established for the parameter during the particular preceding duration of time;
the first indicator comprises shading adjacent to the value;
the second indicator comprises shading adjacent to the value;
the act of displaying to the operator of the system the values of the multiple different parameters of the system includes displaying the values as numbers; and
the act of displaying to the operator of the system the values of the multiple different parameters of the system includes displaying the values over a schematic diagram of the industrial system.

16. The method of claim 15 further comprising an act of displaying to the operator of the system a plot of the value over the particular preceding duration of time wherein: the act of displaying to the operator of the system the plot of the value over the particular preceding duration of time is performed when the operator hovers a cursor over the value; and the plot displays the operating limit established for the parameter.

17. A computerized method of communicating behavior of an industrial system to an operator of the system, the method comprising, using a computer, acts of:
collecting measured values of multiple different parameters of the system;
displaying to the operator of the system the measured values of the multiple different parameters of the system;
displaying to the operator of the system a first alert indicator for each value of the measured values when, and only when, the value has exceeded an upper operating limit established for the parameter during a particular preceding duration of time, wherein the first alert indicator is displayed on a first side of the value; and
displaying to the operator of the system a second alert indicator for each value of the measured values when, and only when, the value has gone below a lower operating limit established for the parameter during the particular preceding duration of time, wherein the second alert indicator is displayed on a second side of the value and the first side is opposite the second side; wherein:
the first side or the second side is right of the value; and
the first side or the second side is left of the value.

18. The method of claim 17 wherein:
the first alert indicator is displayed adjacent to the value;
the second alert indicator is displayed adjacent to the value; and
the value is displayed as a number.

19. The method of claim 17 wherein:
the first alert indicator comprises shading displayed on the first side of the value;
the second alert indicator comprises shading displayed on the second side of the valued.

20. The method of claim 17 further comprising:
varying intensity of the first alert indicator based on frequency, extent, or duration of the value exceeding the upper operating limit established for the parameter during the particular preceding duration of time; and
varying intensity of the second alert indicator based on frequency, extent, or duration of the value going below the lower operating limit established for the parameter during the particular preceding duration of time;
wherein: intensity of the first alert indicator is varied by changing at least one of color, brightness, darkness, or size of the first alert indicator; and intensity of the second alert indicator is varied by changing at least one of color, brightness, darkness, or size of the second alert indicator.

21. The method of claim 17 wherein the measured values were transmitted to the computer.

22. The method of claim 17 further comprising an act of correcting the behavior of the industrial system.

23. The method of claim 17 further comprising an act of, using the computer, prompting to input: the particular preceding duration of time; the operating limit established for the parameter; or an operating limit percentage.

* * * * *

UNITED STATES PATENT AND TRADEMARK OFFICE
CERTIFICATE OF CORRECTION

PATENT NO.           : 10,782,678 B2
APPLICATION NO.      : 15/903961
DATED                : September 22, 2020
INVENTOR(S)          : Eric F. LeBlanc Page 1 of 1

It is certified that error appears in the above-identified patent and that said Letters Patent is hereby corrected as shown below:

In the Claims

Column 18, Line 26 In Claim 19, change the last word, "valued", to "value".

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*